219-121

12/30/80 OR 4,242,562 SR

United States Patent [19]

Karinsky et al.

[11] 4,242,562

[45] Dec. 30, 1980

[54] PLASMA ARC TORCH HEAD

[76] Inventors: Viktor N. Karinsky, Odintsovo, bulvar Novoselovoi, 10, kv. 43, Moskovskaya oblast; Ivan A. Kuznetsov, Yarzevskaya ulitsa, 31, korpus 5, kv. 8, Moscow; Viktor I. Kutsyn, Ruzsky raion, poselok Dorokhovo, Zheleznodorozhny proezd, 17, Moskovskaya oblast, all of U.S.S.R.

[21] Appl. No.: 930,216

[22] Filed: Aug. 2, 1978

[51] Int. Cl.[3] .................... B23K 9/00

[52] U.S. Cl. .................... 219/121 P; 219/75; 219/123

[58] Field of Search .................... 219/121 P, 121 R, 75, 219/137 R, 74, 123; 313/231.4

[56] References Cited

U.S. PATENT DOCUMENTS

| | | | |
|---|---|---|---|
| 3,370,148 | 2/1968 | Von Ardenne | 219/75 |
| 3,390,292 | 6/1968 | Perugini | 219/75 |
| 3,450,926 | 6/1969 | Kiernan | 219/121 P X |
| 3,452,239 | 6/1969 | Wolf et al. | 219/123 |
| 3,760,145 | 9/1973 | Wolf et al. | 219/121 P |
| 3,851,140 | 11/1974 | Coucher | 219/121 P |
| 3,924,092 | 12/1975 | Lessmann et al. | 219/123 |
| 3,953,705 | 4/1976 | Painter | 219/121 P |
| 4,127,760 | 11/1978 | Meyer | 219/121 P |

FOREIGN PATENT DOCUMENTS

| | | | |
|---|---|---|---|
| 490593 | 3/1976 | U.S.S.R. | 219/123 |

*Primary Examiner*—B. A. Reynolds
*Assistant Examiner*—M. Paschall
*Attorney, Agent, or Firm*—Burgess, Ryan and Wayne

[57] ABSTRACT

In the body of a plasma arc torch head coolant inlet ducts extend normally to the portions of the nozzle surface subject to maximum heating. The rate of cooling and a permissible power of the plasma arc torch are markedly increased by directing the flow of incoming coolant directly against the surface being cooled. Where the nozzle lateral surface is exposed to the effect of a plasma-forming arc, the coolant inlet ducts are arranged so as to open radially into said lateral surfaces. If electromagnetic coils are provided to allow control over the plasma jet, a coolant is supplied to effect intensive cooling of the nozzle end face.

7 Claims, 4 Drawing Figures

PLASMA ARC TORCH HEAD

BACKGROUND OF THE INVENTION

1. Field of the Application

The present invention relates to plasma arc torches. More specifically, the invention is concerned with electric arc devices for heating and treating materials, wherein the arc discharge is acted upon by an external magnetic field. This invention also has to do with plasma arc torches with a magnetically-controlled arc, which are used for melting and treating materials with a plasma arc.

2. Description of the Prior Art

There is known a metal melting plasma arc torch which comprises a cathode, a cathode holder, a cooled body and a nozzle.

The most important working member of the torch head in such torches is the nozzle, since the latter is exposed to high temperatures in the course of operation. The interior passage of the nozzle is cooled with a flow of water which is directed along the cooled wall thereof and is passed through an annular recess. By reason of high heat loads acting on the nozzle interior passage, a flow of water must be supplied at a high rate and under great pressure.

There are also known plasma arc torches of indirect action, which are provided with a centrally disposed electrode surrounded by a nozzle. In a flow of gas passing through the nozzle interior there burns an electric discharge which is acted upon by external magnetic field with the purpose of creating pinch effect and raising the plasma jet temperature (cf. U.S. Pat. No. 2,945,119), and also with the purpose of deflecting the plasma jet away from the nozzle axis (cf. Japanese Pat. No. 6958), or to dissipate the heat flux of the plasma jet (cf. Japanese Pat. No. 3261), as well as to enable other operations.

A magnetic field is most frequently used for the purpose of causing the arc to rotate about the internal surface of the plasma arc torch nozzle, this permitting the arc burning voltage and the torch efficiency to be increased, and the nozzle erosion to be substantially inhibited.

British Patent Specification No. 966,103 describes, for example, a plasma arc torch (plasma generator) which comprises a body having a cooled nozzle attached thereto and accommodating a centrally disposed electrode. A plurality of electromagnetic coils fitted over the nozzle coaxially therewith are fixed and protected from heat by means of a fixing ring member in threaded engagement with the nozzle. The arc rotation in the nozzle interior passage at various sections thereof is achieved by alternately energizing the magnetic coils. The disadvantage of the torch construction according to the patent referred to above lies in that the magnetic coils are poorly protected from the heat radiated from the fixing member, or from the particles of the material being treated. For example, by using this type of the torch for making granules, the magnetic coils are rapidly put out of order due to failure in the insulation caused by the heat radiation or by incandescent particles of said material.

An object of the invention is to provide such a plasma arc torch head which will permit the power of a torch to be enhanced by means of improving the conditions of cooling the surfaces subject to maximum heating in the process of operation.

Another object of the invention is to provide a plasma arc torch head which will be sufficiently reliable and durable in operation.

Still another object of the invention is to provide a plasma arc torch head which will have sufficient durability when operated in the conditions of plasma jets of complex configuration, controlled by an electromagnetic field.

It is also an object of the invention to provide an improved plasma arc torch head featuring the above-mentioned advantages attained without introducing costly constructional modifications, by relatively simple and reliable means.

These and other objects of the invention are accomplished by the provision of a plasma arc torch head comprising a hollow tubular body through the interior of which passes a flow of plasma-forming gas and wherein are axially arranged an electrode holder and an electrode having its free end surrounded by a cooled nozzle formed with double walls interconnected at the end thereof by means of a solid bridging member and forming the end face of the torch head. The plasma arc torch head according to the invention is characterized by that the head body is formed with coolant inlet ducts which are oriented so as to enable the flow of the incoming coolant to be directed normally to the cooled surfaces of the portions of the nozzle surface subject to maximum heating in the process of generation of plasma jet.

Such constructional arrangement of the plasma arc torch head of the invention permits cooling of the nozzle areas exposed to severe heating to be substantially improved due to directing the flow of incoming coolant directly against the surface being cooled and thus ensuring considerably higher rate of its cooling in contrast to the flow of coolant smoothly passing over the entire surface of said nozzle.

According to one embodiment of the invention, the coolant inlet ducts are formed along the periphery of the torch head body in parallel to its central axis and extend short of the end face of the torch head, the coolant exhaust ducts alternating with the coolant inlet ducts which pass into radial channels extending radially to cooled cylinder-shaped wall of the nozzle.

Such structural arrangement makes it possible to improve the removal of heat from the nozzle surfaces subject to high heat loads with the nozzle wall being exposed to the burning of the plasma-forming arc.

According to another embodiment of the invention, electromagnetic coils are mounted concentrically externally of the nozzle to thereby allow control of the plasma jet at the outlet of the torch, characterized by that said electromagnetic coils are inclosed in a protective housing flush-mounted with the nozzle in the area of the end face thereof, with an annular plug being fitted between the protective housing and the tubular body of the torch head, the coolant inlet ducts extending over the entire length of the electromagnetic coils and normally to said bridging member between the two walls of the nozzle.

Such structural arrangement enables the electromagnetic coils to be protected from destruction and turn-to-turn short-circuiting caused by high temperatures of the plasma jet, given out by the material being treated owing to sufficient cooling of the nozzle end face and by providing a ring-shaped plug.

Such construction of the plasma generator permits the electromagnetic coils to be isolated from the effect of high temperatures of the ambient atmosphere while making use of the cooled portion of the nozzle and of the fixing plug member intended to close the space with the magnet coils enclosed therein and used to fixedly attach the nozzle to the body. Being disposed within an easy reach, the coils are readily changeable. In addition, it is easy to lead out the terminals, since the enclosure containing the coils is not sealed.

According to still another embodiment of the invention, the fixing plug member is made of ferromagnetic material in the form of a ring threaded at both faces differing from each other in at least one feature such as pitch or direction of thread.

Such structural arrangement makes it possible to enhance the effect of the electromagnetic coils on the plasma jet by stepping up intensity of the magnetic field thereof.

BRIEF DESCRIPTION OF THE ACCOMPANYING DRAWINGS

The invention will be further described, by way of example only, with reference to the accompanying drawings, in which.

DETAILED DESCRIPTION OF THE PREFERRED EMBODIMENTS

Figure 1:
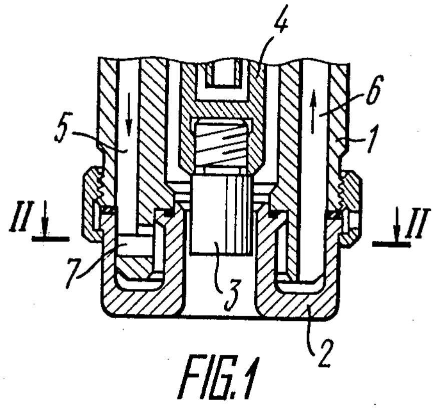
FIG. 1 is a view of a plasma arc torch head formed with radial ducts intended for cooling side walls of a nozzle.
Figure 2:
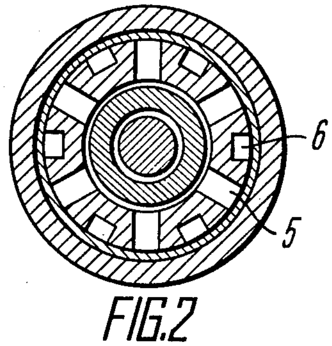
FIG. 2 is a cross-section taken along plane II—II of FIG. 1.

Referring now to the drawings in reference to FIGS. 1 and 2, there is shown a plasma arc torch head which comprises a cylindrical body I and a cooled nozzle 2 attached thereto and accommodating in its interior a cathode 3 fixed in a cathode holder 4.

The interior of the body I is formed with an even number of vertical channels or ducts, with inlet ducts 5, through which a coolant such as water passes to the nozzle 2, alternating with coolant exhaust ducts 6. In the upper part of the plasma arc torch head (not shown) there are positioned a header and an exhaust manifold. In the lower part of the head body I the inlet ducts 5 pass into radial ducts 7 extending normally to the cylindrical portion of the nozzle 2. The exhaust ducts 6 extend normally to the end face of the nozzle 2.

Figure 3:
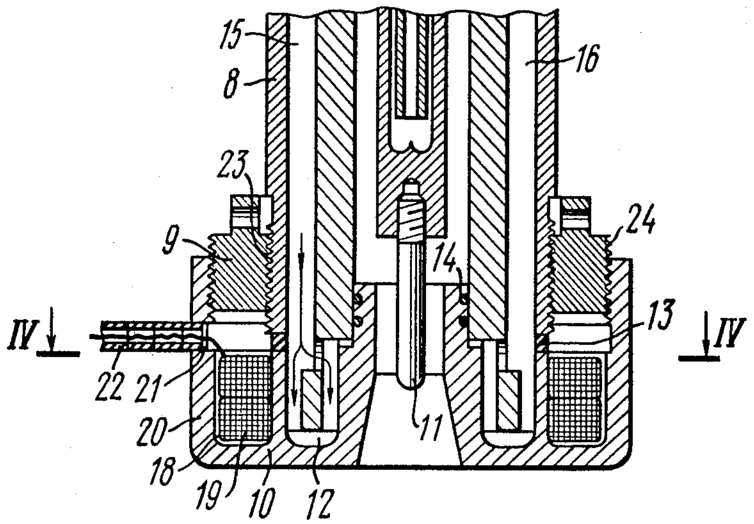
FIG. 3 is a view of a plasma arc torch head with electromagnetic coils enclosed in a protective housing.
Figure 4:
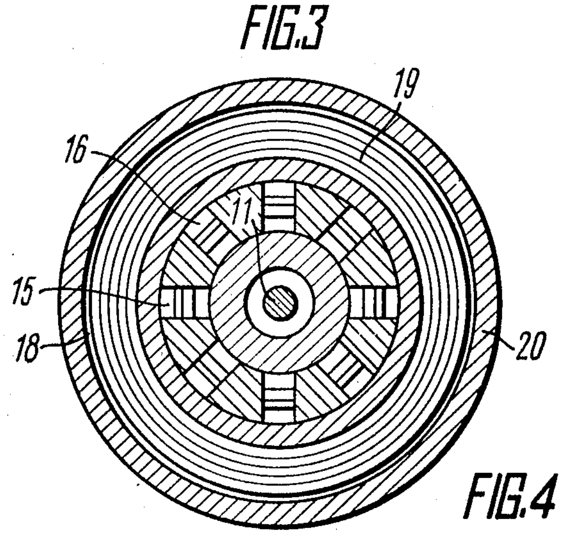
FIG. 4 is a cross-section taken along plane IV—IV of FIG. 3.

Referring now to FIGS. 3 and 4, there is shown therein the plasma arc torch head according to the invention intended for treating various materials. The plasma arc torch comprises a housing 8, a fixing plug member 9 by means of which a nozzle 10 is attached to said housing 8, and a central electrode 11. The nozzle 10 has an interior passage 12 through which circulates a coolant. The cooling passage 12 is sealed at the place of its juncture with the housing 8 by means of packings 13 and 14. The housing 8 is formed with inlet ducts 15 and exhaust ducts 16, which have radial passages 17 in their lower portions, whereby a flow of coolant is branched to be fed normally to the side and end faces of the nozzle 10. A closed space 18, wherein are arranged electromagnetic coils 19, is formed by the external wall of the nozzle 10, protective housing 20 hermetically joined with the nozzle 10 at the end face area thereof, as well as by the fixing plug member 9. The terminals of the coils are led out through apertures 21 formed in the internal part of the nozzle 10, the leads being insulated by means of heat-resistant insulators 22. The fixing plug 9 is made in the form of a ring and is formed with two threaded sections at the place of contact with the housing 8 and at the place of contact with the nozzle 10. The threaded sections 23 and 24 ensure reliable electric contact between the nozzle 10 and the housing 8 through the fixing plug member 9.

The sections 23 and 24 of the plug 9 in threaded engagement with the housing 8 are formed with mating threads extending either in the same direction or in opposite directions.

If the mating threads extend in the same direction, the sections in question will be threaded to have different thread pitches, which allows for greater pressing force enabling tight connection between the nozzle 10 and the housing 8.

With the mating threads extending in different directions, the threaded sections can be formed both with the same and different thread pitch. Such connection ensure rapid removal and mounting of the nozzle 10.

The fixing plug member 9 can be made of a ferromagnetic material, which makes it possible to effect both the intensity and shape of the magnetic field established by the coils 19.

The plasma arc torch head of the invention as set forth in the drawing can be variously otherwise embodied. For example, the fixing plug member 9 may be made in the form of a shell enclosing the electromagnetic coils 19 and connected with the nozzle 10 and with the housing 8 by means of internal mating threads such as shown at 23 and 24.

According to another embodiment of the invention, the central electrode can be dispensed with, for example, in the case when the arc is burning between the nozzle and the material being treated.

The plasma arc torch is preferably assembled in the following manner. First, the plug 9 is screwed on the housing 8. Then, the nozzle 10 together with the coils 19 arranged in its interior 18 is connected through the packing 13 to the housing 8. Thereafter, by turning the fixing plug member 9 about its axis, the position of the nozzle 10 remaining unchanged, the latter is fixedly attached to the housing 8, and the cooling interior passage is sealed by means of the packing 13.

Arc discharge is excited between the central electrode II and the nozzle 10. A flow of plasma-forming gas is then delivered to the interspace between the central electrode II and the nozzle 10, which gas flow expands and thence bursts out of the nozzle in the form of plasma jet. The heat energy, released during operation of the plasma arc torch head and given off by the plasma jet and by the incandescent material being treated, is absorbed by the external cooled portion of the nozzle surface and is thence removed by means of the coolant. The fixing member, enclosing the interior wherein are arranged the coils 19 and adapted to fixedly attach the nozzle 10 to the housing 8, is disposed in the least heated zone. Thus, the magnetic coils 19 are protected from heat at all sides with the structural parts heated insufficiently to cause any damage to the insulation.

The plasma arc torches constructed in accordance with the invention and having a power of up to 70 kv were tested to show reliable cooling of the nozzle and protection of electromagnetic coils from heat radiation and from the particles off the material being treated, as well as reliable electric contact between the nozzle and the housing. The plasma arc torches were tested on granulators.

What is claimed is:

1. A plasma arc torch head comprising a hollow tubular body through the interior of which passes a flow of plasma-forming gas and wherein are coaxially arranged an electrode holder and an electrode having its free end surrounded by a cooled nozzle formed with double walls connected at the end thereof by means of a solid bridging member and forming the end face of the torch head, with the body of the torch head being formed with coolant inlet and exhaust ducts which are oriented so as to enable the flow of the incoming coolant to be directed normally to the cooled portions of the nozzle surface subject to maximum heating in the process of generation of a plasma jet, said inlet and exhaust ducts being alternatively disposed in an annular ring about said electrode holder and electrode, with radially directed passages situated adjacent the solid bridging member for communicating each inlet duct to an adjacent exhaust duct, and wherein electromagnetic coils are mounted concentrically externally of the nozzle to thereby enable control of the plasma jet at the outlet of the torch, said electromagnetic coils being enclosed in a protective housing flush-mounted with the nozzle in the area of the end face thereof, with a ring-shaped plug being fitted between the protective housing and the tubular body of the torch head, said coolant inlet ducts extending over the entire length of the electromagnetic coils and normally to said bridging member between the two walls of the nozzle.

2. A plasma arc torch head comprising:

a hollow tubular body having a longitudinal axis;

means for passing a flow of plasma-forming gas through the interior of said body;

an electrode holder and an electrode axially arranged in said body, said electrode having a free end;

a nozzle secured to one end of said body surrounding the free end of said electrode and having double cylindrical walls connected at the ends thereof adjacent said free end by a solid bridging member;

a fixing element arranged to fasten said nozzle to said body;

said body having a number of channels therein parallel to the longitudinal axis thereof, for supplying a coolant to, and removing said coolant from, those areas of the nozzle surface which are subject to more intensified heating in the course of burning of a plasma jet adjacent said electrode, wherein the channels arranged to feed-in and take-away the coolant are positioned in an alternate manner, the take-away channels being directed normally to said bridging member at the end of said nozzle, while the feed-in channels are transformed through a transition area into radial channels directed normally to the cylindrical walls of the nozzle; and electromagnetic coils mounted co-axially around the nozzle for controlling the plasma jet, said coils being disposed in a closed cavity limited by the outer wall of the nozzle, by the tubular body and by said fixing element.

3. A plasma arc torch head as set forth in claim 1, wherein said plug is made of a ferromagnetic material in the form of a ring threaded at both faces differing from each other in at least one feature such as thread pitch or thread direction.

4. A plasma arc torch head as claimed in claim 2, wherein said fixing element is coupled by means of a first thread with the body of the torch and by means of a second thread to the nozzle, wherein one thread differs from the other in thread pitch or thread direction.

5. A plasma arc torch head as claimed in claim 4, wherein said nozzle and tubular body are made as an integral construction element in the form of three coaxial cylindrical walls, interconnected at the end by said solid bridging member, said fixing element comprising a ring-shaped plug.

6. A plasma arc torch head as claimed in claim 4, wherein said fixing element and the tubular body are made as an integral construction element comprising a sleeve.

7. A plasma arc torch head as claimed in claim 5 or 6, wherein said fixing element comprises a ferromagnetic material.

* * * * *